Figure 3:
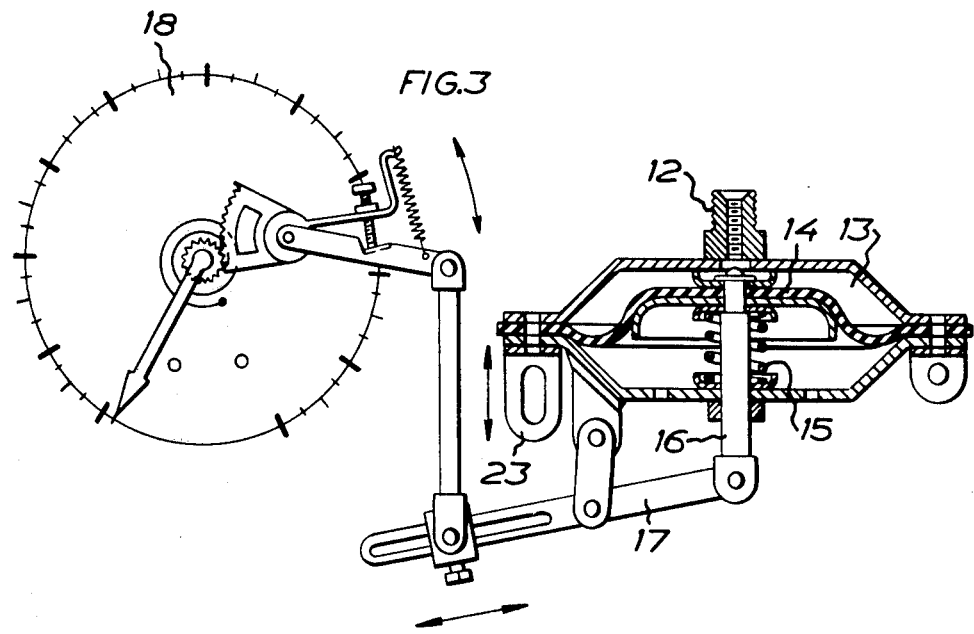

United States Patent [19]

Hellkvist

[11] 4,036,317
[45] July 19, 1977

[54] APPARATUS FOR MEASURING LOADS

[75] Inventor: John William Hellkvist, Malmo, Sweden

[73] Assignee: AB Stathmos, Jonkoping, Sweden

[21] Appl. No.: 629,683

[22] Filed: Nov. 6, 1975

[51] Int. Cl.² .................. G01G 5/04; G01G 19/08; G01G 21/10
[52] U.S. Cl. .................................. 177/209; 177/137; 177/187; 177/255
[58] Field of Search ............... 177/137, 187, 209, 255

[56] References Cited
U.S. PATENT DOCUMENTS

| 3,241,626 | 3/1966 | Woodburn | 177/137 |
| 3,306,384 | 2/1967 | Ross | 177/209 X |
| 3,321,035 | 5/1967 | Tarpley | 177/255 X |
| 3,526,287 | 9/1970 | Flinth | 177/255 X |
| 3,648,790 | 3/1972 | Bishop | 177/137 |
| 3,724,571 | 4/1973 | Thorn et al. | 177/137 X |

Primary Examiner—George H. Miller, Jr.

[57] ABSTRACT

An apparatus for measuring loads with the use of a plurality of measuring points, for instance in motor vehicles, in which one load-supporting measuring element is placed at each measuring point and contains a resilient material, such as rubber, for taking up lateral forces acting upon the measuring element.

6 Claims, 12 Drawing Figures

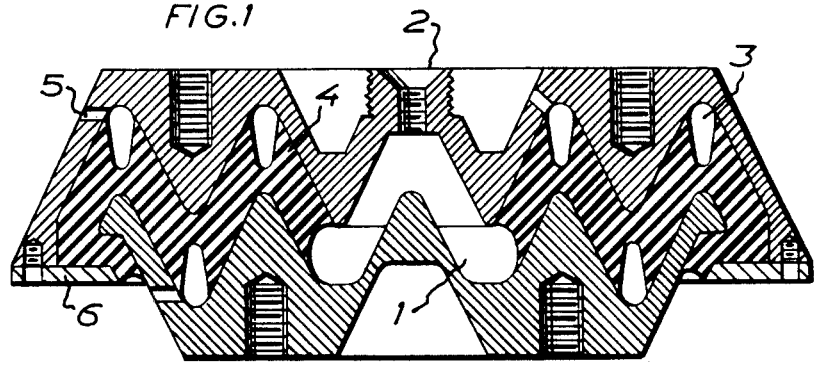
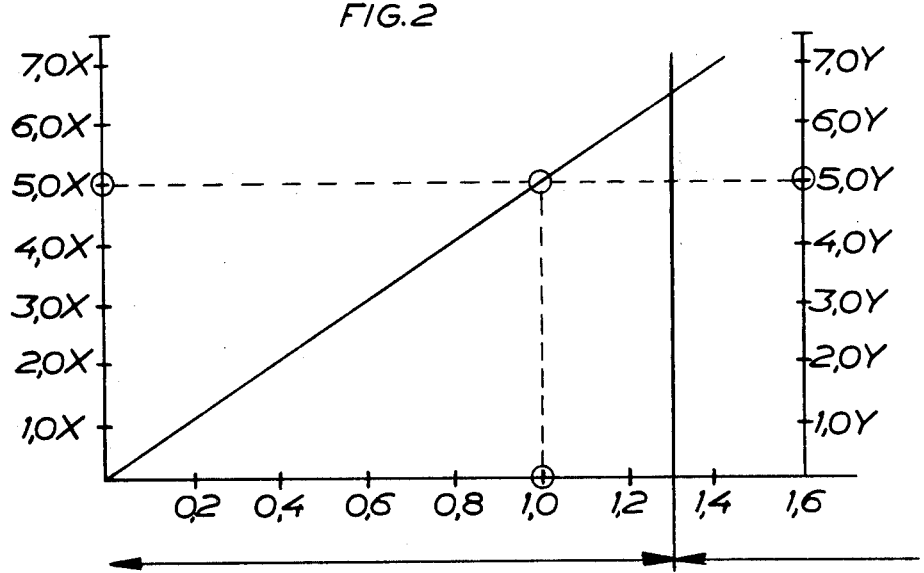

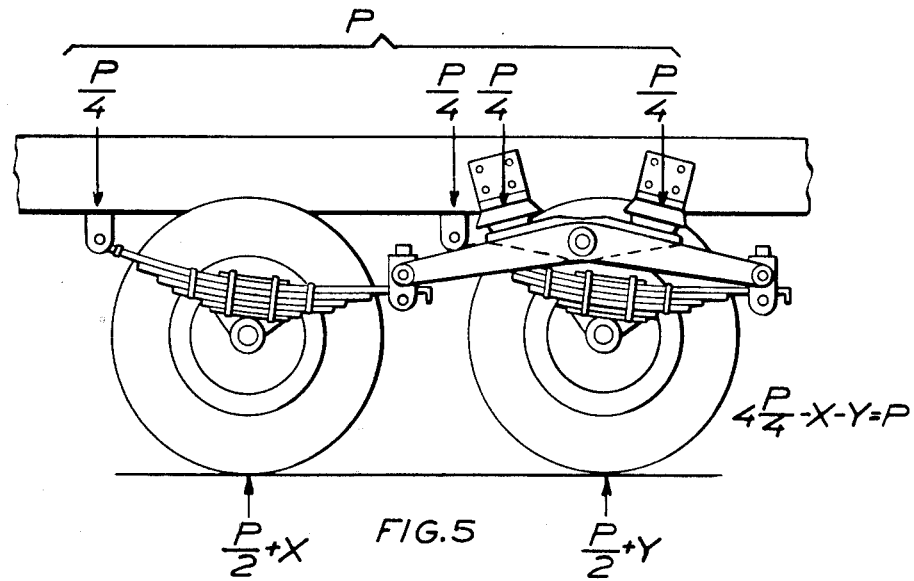
FIG. 5
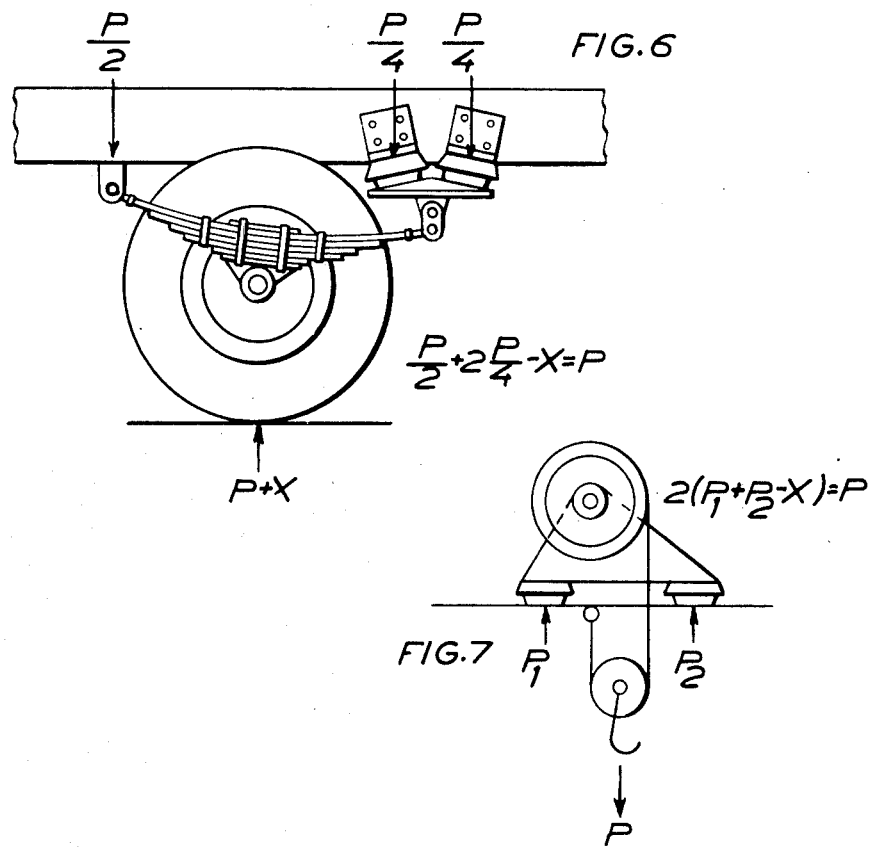
FIG. 6
FIG. 7

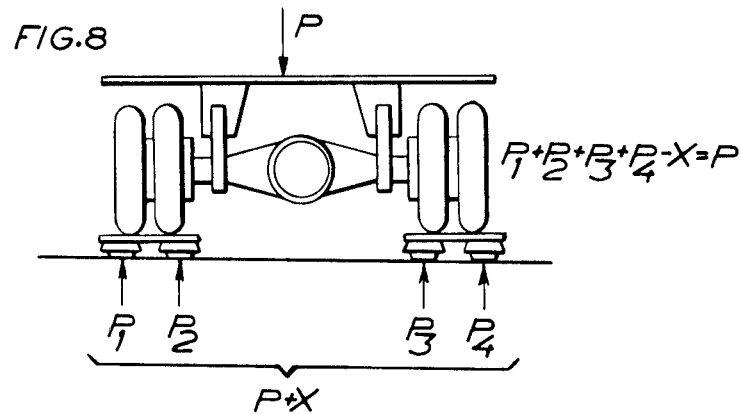
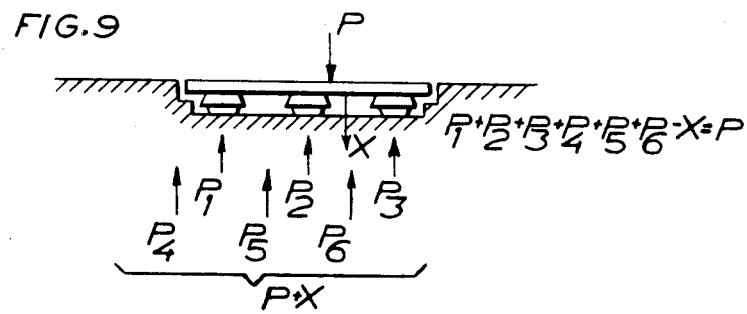
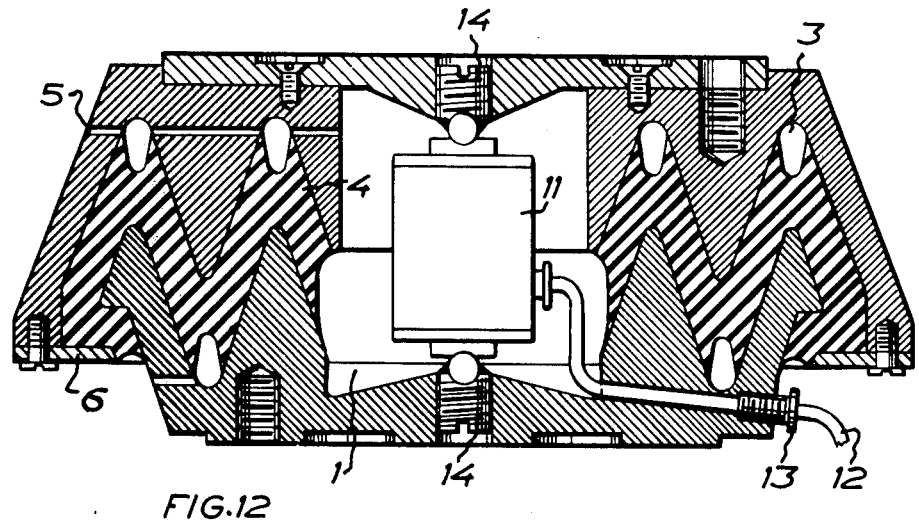

APPARATUS FOR MEASURING LOADS

This invention relates to an apparatus for measuring loads with the use of a plurality of measuring points, for instance in vehicles, one load-supporting measuring element being placed at each measuring point.

The law on maximum loads for motor vehicles, such as lorries, trucks etc., which came into force in Sweden on Apr. 1, 1973 and which imposes penalties for overloads, has made it necessary to permit establishing at any time the sizes of current loads. The hitherto available load measuring equipment has proved imperfect.

In measuring loads, for instance at unsymmetrical load distribution, it has hitherto proved difficult, using the available equipment, to establish the total weight in a simple manner. Thus, it has, among other things, been difficult to add the loads from the different pressure measuring elements at the different measuring points. The systems available at present which are designed for mounting on cargo vehicles measure the hydraulic pressures via special mechanical devices which lift the load carrying platform at the respective wheel or axle. Measurement of the sum total from a number of differently loaded measuring points (load points), cannot therefore be effected at oblique loads, because different pressures cannot be added. Moreover, mounting of the devices proves expensive and complicated.

The use of electric transducers, such as inductive transducers or strain gauges, has also proved difficult since these transducers are extraordinarily sensitive to lateral forces, i.e. forces directed at right angles to the force produced by the load.

This invention aims at solving these and associated problems. According to the invention each measuring element contains a resilient material, such as rubber, for taking up lateral forces which act upon the measuring element.

Such an apparatus permits effective load measurements to be made also at oblique loads, and rapidly gives a correct value of the load, thus making it possible to avoid overloads etc.

The invention is illustrated in the accompanying drawings in which

Figure 4:
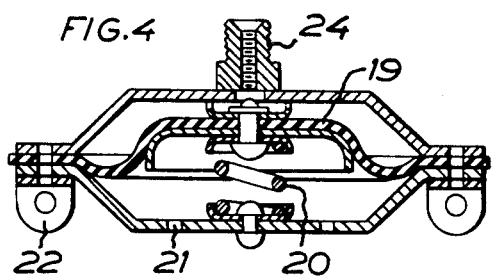
Figure 10:
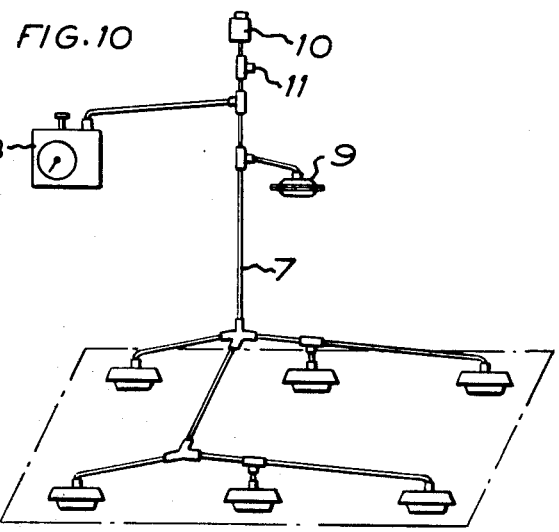
Figure 11:
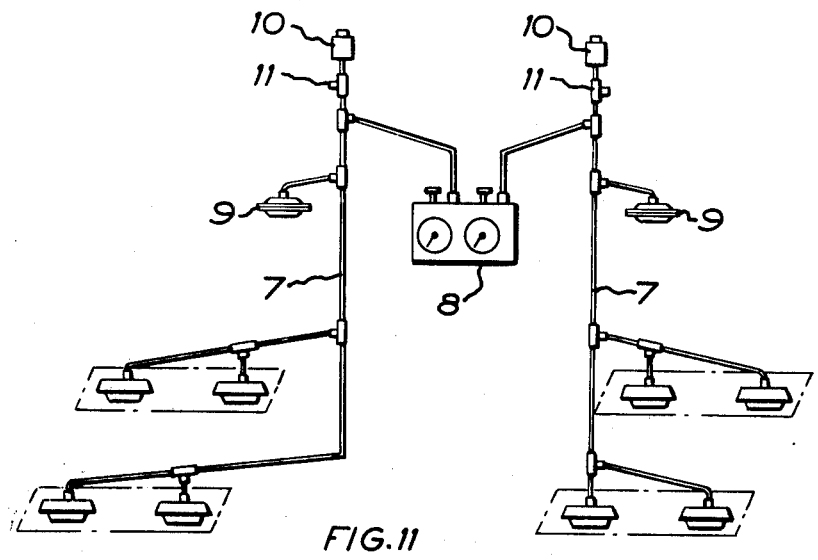

FIG. 1 shows a measuring element,

FIG. 2 shows the interrelation between the compression of the measuring element and the load, FIG. 3 shows the central measuring unit, FIG. 4 a shock element, FIGS. 5 and 6 show the placing of the measuring element, FIGS. 7, 8 and 9 show alternative placings of the measuring elements according to the invention, FIGS. 10 and 11 show two alternatives of how to connect the different measuring elements with a central measuring unit, and FIG. 12 shows the measuring element with an electric transducer.

FIG. 1 shows an individual measuring element according to the invention. This element substantially presents rotation symmetry and is disc-shaped having a zigzag-shaped or angular inner space 3. Centrally in said space there is held a measuring liquid 1 which on compression of the measuring element is at least partly expelled through a pipe socket 2. In addition to said space for the measuring liquid 1 there is arranged a filling of load-supporting resilient material, such as for instance rubber 4. The space 3 is ventilated at 5. The measuring element is provided with a metallic safety ring 6 which is disposed at the outer periphery of the element. By reason of its design the element will be capable of taking up lateral forces and/or pull. This is particularly suitable when exceptional lateral forces or pull arise, which may often happen in such measuring operations.

FIG. 2 shows the interrelation between the compression of a measuring element and the size of the load expressed in metric tons. The compression in mm is multiplied by a factor X, where X is dependent upon the quality and hardness of the rubber. To the right in FIG. 2 the volume reduction in $cm^3$ is shown when the measuring element is under load, the figures being multiplied by factor Y which is dependent upon the basis and height of the enclosed measuring liquid. The normal load of the measuring element is shown in the left-hand portion of FIG. 2, while it is indicated in the right-hand portion of the FIG. when the shock element becomes active at overloads or shock loads.

FIG. 10 shows the interconnection of six different measuring elements, suitably placed over (or under) the wheels of a vehicle or other load having several measuring points. The spaces holding the liquid are connected via their pipe sockets (see 2 in FIG. 1) to a common measuring liquid conduit 7 which leads to a central volume measuring element 8 in which the total load is easily measured as a function of the total volume of measuring liquid expelled from the different measuring elements. A shock element 9, the function of which is described hereinbelow with reference to FIG. 4, is also connected to the central measuring conduit. Measuring liquid is supplied from a container 10, see FIG. 10. A venting valve for venting the system is shown at 11 in FIG. 10.

FIG. 11 shows an alternative embodiment in which separate measuring systems are provided for respectively the front axlt and the rear axle (bogie) of a load carrying vehicle. In this case, the load on the front wheel axle and that on the rear wheel axle are thus specifically measured.

FIG. 3 shows the central measuring unit which int. al. contains a generally known pressure pad. This unit comprises a pipe socket 12 for receiving the common pressure medium conduit 7 (see FIG. 10), said socket leading to a central liquid space 13 which is defined in a downward direction by a rubber diaphragm 14. A conventional return spring 15 acts against the diaphragm. The return spring is wound around a spindle 16 which via link means 17 is in connection with a measuring instrument 18 for indicating the total load.

FIG. 4 shows a pressure pad, here designated as shock element, with a pipe socket 24 for connection with the central conduit 7, see FIG. 10. This pressure pad also has a rubber diaphragm 19 but has a stiffer type of counterpressure spring 20. Ventilation of the spring housing may be provided at 21 and the shock element may be fastened by means of fastening lugs 22.

FIG. 3 shows fastening lugs. The left-hand lug 23 is provided with a slot which permits coarse adjustment of this device.

The link means 17 is also provided with an adjusting device for the calibration of the apparatus. The remaining measuring instrument according to FIG. 3 is of the conventional type and need not therefore be discussed more in detail. Its function will be fully evident from FIG. 3. The apparatus can of course also be supplemented with a signalling means which is released at overloads.

FIGS. 5, 6 and 7 show various placings of the measuring elements, and the Figures also show how the load will then be distributed. The total load is here designated P and the Figures thus show how large a proportion of the load will rest on the different measuring points in these systems. FIG. 7 shows another placing of the apparatus on a lifting means, where two measuring points $P_1$ and $P_2$ have been provided for measuring the load P. Letters X and Y in the Figures indicate the known proper weights.

It is indicated in FIG. 8 how measuring elements can be provided under the wheels and connected according to FIG. 10 or FIG. 11. Here, different measuring elements $P_1$, $P_2$, $P_3$ and $P_4$ are disposed under the wheels and, when connected to FIG. 10, these measuring elements will give a measure of the total load P. Letter X in the Figure indicates the known proper weight. FIG. 9 shows a floor-mounted weighing machine having six measuring points $P_1$, $P_2$, $P_3$, $P_4$, $P_5$ and $P_6$ connected for instance according to FIG. 10. As will be realized, a non-uniform load distribution is irrelevant here since the volume measuring element measures the sum of the loads from the respective measuring elements $P_1$, $P_2$, $P_3$, $P_4$, $P_5$ and $P_6$. Letter X in the Figure indicates the known proper weight.

The measuring instrument according to FIG. 3 is provided with an engagement and disengagement means and fine-adjusting and zeroizing device int. al. for temperature compensation. The measuring instrument can also be provided with an adjustable signalling means for indicating overloads, as pointed out in the foregoing.

The shock element according to FIG. 4 should be given such a volume that it can be adapted to the maximum load that may occur at shock loads, which fundamentally is equal to the sum of the measuring liquid volumes of the group of measuring elements.

FIG. 12 shows an alternative embodiment of the measuring element in FIG. 1. In this alternative embodiment an electric transducer 11 is mounted in the space of the measuring element which in FIG. 1 is filled with a pressure medium. The transducer 11 is such that it produces, in a line 12, an electric measuring signal responsive to the load. The line 12 is passed through an opening 13 in the measuring element to a central measuring unit in which the measuring signal is added to the measuring signals of the other measuring elements to give a measure of the total load. The transducer 11 is so mounted in the measuring element by means of screws provided with balls that it is not subjected to lateral forces acting upon the measuring element.

The transducer 11 can of course be a transducer of the type that produces a measuring signal responsive to the compression of the measuring element, such as an inductive transducer, where the resilient material 4 is load-supporting. But it can also be a transducer of the type that produces a measuring signal responsive to the compressive force acting upon the measuring element, such as a strain gauge, which supports the load without any essential compression. In the latter case the resilient material only serves the task of taking up lateral forces acting upon the measuring element.

What I claim and desire to secure by letters patent is:

1. An apparatus for measuring loads with the use of a plurality of measuring points, said measuring points consisting of one load-supporting measuring element being placed at each measuring point, wherein each measuring element comprises an upper fastening element, a lower fastening element and means interjacent thereto for taking up lateral forces acting upon the measuring element, said means comprises a ring of resilient material whereby a central space is provided therein for accommodating a pressure medium consisting of a transducer or a volume of measuring liquid.

2. An apparatus as claimed in claim 1, wherein each resilient material in each measuring element is arranged to take up also pressure forces acting upon the measuring element, and has a space the volume of which is reduced as the compression of the measuring element increases as a result of increasing load whereby the load is measurable by summation of the expelled volumes of a pressure medium contained in said spaces in all of the measuring elements.

3. An apparatus as claimed in claim 1, wherein each measuring element contains an electric transducer which is adapted to produce an electric signal dependent upon the compression of the element, and which is so mounted in the measuring element as not to be loaded by lateral forces acting upon the measuring element.

4. An apparatus as claimed in claim 1, wherein each measuring element contains a load-supporting pressure-sensitive electric transducer which is adapted to produce an electric signal dependent upon the compression force of the load on said measuring element, and which is so mounted in said measuring element as not to be loaded by lateral forces acting upon the measuring element.

5. An apparatus as claimed in claim 1, wherein the resilient material in each measuring element is disposed in angular or zigzag-shaped spaces for taking up lateral forces but also pressure forces and shear forces.

6. An apparatus as claimed in claim 5, wherein each measuring element is made safe at its outer periphery by means of a safety ring in order to permit taking up also pull.

* * * * *